US007065532B2

(12) United States Patent
Elder et al.

(10) Patent No.: US 7,065,532 B2
(45) Date of Patent: *Jun. 20, 2006

(54) SYSTEM AND METHOD FOR EVALUATING INFORMATION AGGREGATES BY VISUALIZING ASSOCIATED CATEGORIES

(75) Inventors: Michael D. Elder, Greer, SC (US); Jason Y. Jho, Raleigh, NC (US); Vaughn T. Rokosz, Newton, MA (US); Andrew L. Schirmer, Andover, MA (US); Matthew Schultz, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

This patent is subject to a terminal disclaimer.

(21) Appl. No.: 10/286,508

(22) Filed: Oct. 31, 2002

(65) Prior Publication Data

US 2004/0088323 A1    May 6, 2004

(51) Int. Cl.
*G06F 17/30* (2006.01)

(52) U.S. Cl. .............................. 707/102; 707/3; 706/50

(58) Field of Classification Search ................ 707/1–6, 707/100–104.1, 10, 200; 706/45–50, 14, 706/61; 702/179–182; 717/109, 111, 113; 715/512–514
See application file for complete search history.

(56) References Cited

U.S. PATENT DOCUMENTS

| 4,908,761 | A |   | 3/1990  | Tai ............................ 364/401 |
| 5,371,673 | A |   | 12/1994 | Fan ........................ 364/419.01 |
| 5,745,113 | A |   | 4/1998  | Jordan et al. ................ 345/349 |
| 5,933,818 | A | * | 8/1999  | Kasravi et al. ............... 706/12 |
| 6,006,223 | A |   | 12/1999 | Agrawa et al. ................ 707/5 |
| 6,018,734 | A |   | 1/2000  | Zhang et al. .................. 707/3 |
| 6,070,143 | A |   | 5/2000  | Barney et al. ................. 705/8 |
| 6,112,201 | A | * | 8/2000  | Wical ............................ 707/5 |
| 6,115,709 | A | * | 9/2000  | Gilmour et al. ................ 707/9 |
| 6,115,718 | A | * | 9/2000  | Huberman et al. ......... 707/102 |
| 6,138,128 | A |   | 10/2000 | Perkowitz et al. .......... 707/501 |
| 6,148,294 | A |   | 11/2000 | Beyda et al. ................... 707/1 |
| 6,154,739 | A | * | 11/2000 | Wrobel .......................... 707/6 |
| 6,177,932 | B1 |  | 1/2001  | Galdes et al. ............... 345/733 |
| 6,182,067 | B1 |  | 1/2001  | Presnell et al. ................ 707/5 |
| 6,195,657 | B1 |  | 2/2001  | Rucker et al. ................. 707/5 |
| 6,199,067 | B1 |  | 3/2001  | Geller ......................... 707/10 |
| 6,212,494 | B1 |  | 4/2001  | Boguraev ..................... 704/9 |
| 6,216,098 | B1 |  | 4/2001  | Clancy et al. ................. 703/6 |
| 6,233,583 | B1 |  | 5/2001  | Hoth .......................... 707/102 |
| 6,249,779 | B1 |  | 6/2001  | Hitt .............................. 706/1 |

(Continued)

FOREIGN PATENT DOCUMENTS

EP    1401181 A1 *  3/2004

(Continued)

OTHER PUBLICATIONS

Jonathon D Levy, "measuring and maximizing results through elearning",Oct. 2001, 7 pages.*

(Continued)

Primary Examiner—Srirama Channavajjala
(74) Attorney, Agent, or Firm—Stephen T. Keohane; Shelley M. Beckstrand

(57) ABSTRACT

System and method for evaluating an information aggregate by analyzing categories into which each document of the aggregate is placed. A metrics database stores for each document indicia including associated categories. A query engine is responsive to a user request and the metrics database for aggregating documents having same, unique attributes in an information aggregate and identifying categories associated with documents comprising the information aggregate; and a visualization engine visualizes the category or set of categories, such as by list or distribution frequency, and changes in time over conceptual or physical space.

3 Claims, 10 Drawing Sheets

U.S. PATENT DOCUMENTS

| | | | |
|---|---|---|---|
| 6,266,649 B1 | 7/2001 | Linden et al. | 705/26 |
| 6,275,820 B1 | 8/2001 | Navin-Chandra et al. | 707/3 |
| 6,297,824 B1* | 10/2001 | Hearst et al. | 715/848 |
| 6,334,127 B1 | 12/2001 | Bieganski et al. | 707/5 |
| 6,363,174 B1 | 3/2002 | Lu | 382/209 |
| 6,460,034 B1* | 10/2002 | Wical | 707/5 |
| 6,499,034 B1* | 12/2002 | Mackinlay | 707/102 |
| 6,553,359 B1* | 4/2003 | Schwenkreis | 706/46 |
| 6,640,229 B1* | 10/2003 | Gilmour et al. | 707/9 |
| 6,711,522 B1* | 3/2004 | Shirai et al. | 702/179 |
| 6,728,695 B1* | 4/2004 | Pathria et al. | 707/2 |
| 6,728,702 B1* | 4/2004 | Subramaniam et al. | 707/3 |
| 6,763,354 B1* | 7/2004 | Hosken | 707/6 |
| 6,826,572 B1* | 11/2004 | Colace et al. | 707/10 |
| 6,826,575 B1* | 11/2004 | Waclawski | 707/102 |
| 2002/0035593 A1 | 3/2002 | Salim et al. | 709/202 |
| 2002/0099679 A1* | 7/2002 | Usitalo et al. | 706/46 |
| 2002/0138590 A1* | 9/2002 | Beams et al. | 709/218 |
| 2003/0028564 A1* | 2/2003 | Sanfilippo | 707/513 |
| 2003/0120974 A1* | 6/2003 | Adams et al. | 714/31 |
| 2003/0126136 A1* | 7/2003 | Omoigui | 707/10 |
| 2003/0154196 A1* | 8/2003 | Goodwin et al. | 707/3 |
| 2003/0172357 A1* | 9/2003 | Kao et al. | 715/529 |
| 2003/0212490 A1* | 11/2003 | Mitchell et al. | 702/1 |
| 2004/0049514 A1* | 3/2004 | Burkov | 707/100 |
| 2004/0078750 A1* | 4/2004 | Frank | 715/500 |
| 2004/0186824 A1* | 9/2004 | Delic et al. | 707/3 |
| 2004/0220894 A1* | 11/2004 | Soluk et al. | 706/50 |
| 2005/0004823 A1* | 1/2005 | Hnatio | 705/7 |
| 2005/0004891 A1* | 1/2005 | Mahoney et al. | 707/3 |
| 2005/0165766 A1* | 7/2005 | Szabo | 707/3 |

FOREIGN PATENT DOCUMENTS

| | | | |
|---|---|---|---|
| GB | 2366877 A | * | 3/2002 |
| JP | 2001119403 A | | 4/2001 |
| WO | WO 97/38378 | * | 10/1997 |
| WO | WO 0137162 A2 | | 5/2001 |
| WO | WO0201455 A2 | | 2/2002 |
| WO | WO 2005008536 A1 | * | 1/2005 |

OTHER PUBLICATIONS

Sushmita Mitra et al "data mining in soft computing framework: a survey", IEEE transactions on neural networks, vol. 13, No. 1, Jan. 2002, pp. 3-14.*

Michele Lanza et al. "understanding software envolution using a flexible query engine", submitted ito the formal foundatins of software evolution workshop of CSMR 2001, pp. 1-5.*

William W Cohen et al. "a comparision of string distrance metrics for name-matching asks", 2003 american association for artificial intelligence, 6 pages.*

Chaomei chen et al. "visualizing a knowledge domain's intellectual structure", IEEE Mar. 2001, pp. 65-71.*

Alea M Fairchild, "Knowledge management metrics via balanced scorecard methodology", proceedings of the 35th annual hawaii international conference on system sciences, 2002 IEEE, , 8 pages.*

Andreas Henrich et al. "applying the IRstram retrieval engine for structured documents to INEX", no date, 6 pages.*

Sara Irina Fabrikant, "dealing with the distance-similarity metaphor for knowledge discovery and visualization of very large databases", white paper: ucgis kddlgeovis workshop, reston, va, Nov. 2003 pp. 1-3.*

Dave mattox et al. "enterprise expert and knowledge discovery",proceedings of 8th international conference on Human computer ineraction and special session on intelligent tutoring and learning environments, vol. 2, Aug. 1999, pp. 1-11.*

R.Mack et al. "Knowledge portals and the emerging digital knowlede workplace",IBM systems Journal, vol. 40, No. 4, 2001, pp. 925-955.*

Xavier Polanco et al. "Information visualization", State of the art part C: WP9, EICSTES Project-IST-1999, Jan. 2002, 69 pages.*

Todd peachey et al. "Knowledge management and the leading IS Journals: An analysis of trends and gaps in published research", IEEE 2005, Proceedings of the 38th Hawaii International conference on system sciences-2005, pp. 1-10.*

Giordano Adami et al. "Bootstrapping for hierarchical document classification", proceedings of the twelfth international conference on information and knowledge management, Knowledge manaement session 4, 2003, pp. 295-302.*

Yihwa I.Liou "Knowledge acquisition: issues, techniques and methodology", ACM SIGMIS database, vol. 23, issue 1, 1992, pp. 59-64.*

Brouillette, S. M. and J. P. Lavelle. *A Methodology for Mapping and Analyzing Community Social Services as a System*.Norcross, 6th Industrial Engineering Research Conference Proceedings. Miami Beach, May 17-18, 1997. Institute of Industrial Engineers, Norcross, GA, 1997. 662-667.

Sack, W. *Diagrams of Social Cohesion*. Association for Computational Linguistics, U of Maryland. MIT Media Laboratory, Jun. 1999. 3 plus 8 pages.

Kautz, H., B. Selman, M. Shah.. *Referral Web: Combining Social Networks and Collaborative Filtering*. Communications of the ACM, vol. 40, No. 3, Mar. 1997, 1-4 pages.

Schwartz, M. F., D. C. M. Wood. *Discovering shared interests using graph analysis*. Communications of the ACM, v. 36 n. Aug. 8, 1993. 78-89.

Wellman, B. *For a social network analysis of computer networks: a sociological perspective on collaborative work and virtual community*. Proceedings of the 1996 conference on ACM SIGCPR/SIGMIS. 1-11.

Qureshi, S. *Supporting electronic groupprocesses: a social perspective*. Proceedings of the 1995 ACM SIGCPR Conference on Supporting teams, groups, and learning inside the IS function. ACM Press. 24-34.

Ackerman, M.S., B. Starr. *Social activity indicators: interface components for CSCW systems*. Proceedings of the 8th ACM Symposium on User Interface and Software Technology. ACM Press. 159-168.

Garton, L., C. Haythornthwaite, B. Wellman. *Studying online social networks*in Doing Internet Research, edited by Steve Jones, Thousand Oaks, CA: Sage, 1999, Chapter 4 pp. 75-105.

Srivastava, Jaidepp, Robert Cooley, Mukund Deshpande, Pang-Ning Tan. *Web Usage Mining: Discovery and Applications of Usage Patterns from Web Data*. SIGKDD Explorations, vol. 1, Issue 2. Jan. 2000. 12-23.

Wang, Y. *Web Mining and Knowledge Discovery of Usage Patterns*. CS748T Project (Part I) Feb. 2000, 25 pages.

Sack, W. *Conversation Map: a content-based Usenet newsgroup browser*. Proceedings of the 2000 International Conference on Intelligent User Interfaces. ACM Press. 233-240.

Kaugers, K. *Integrated multi scale text retrieval visualization*. Conference on Human Factors and Computing Systems, Proceedings o fthe Conference on CHI 98 Summary: Human Factors in Computing Systems, ISBN: 1-58113-028-7 ACM Digital Library, 1998. 307-308.

Feldman, R. *Mining unstructured data*. Tutorial notes for ACK SIGKDD 1999. ACM Press. 182-236.

* cited by examiner

XML FORMAT FOR SQL QUERIES

QRML STRUCTURE

SYSTEM AND METHOD FOR EVALUATING INFORMATION AGGREGATES BY VISUALIZING ASSOCIATED CATEGORIES

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 10/286,211 is now pending filed 31 Oct. 2002 for "SYSTEM AND METHOD FOR DETERMINING FOUNDERS OF AN INFORMATION AGGREGATE";

Ser. No. 10/286,263, is now pending filed 31 Oct. 2002 for "SYSTEM AND METHOD FOR FINDING THE ACCELERATION OF AN INFORMATION AGGREGATE";

Ser. No. 10/286,262, is now pending filed 31 Oct. 2002 for "SYSTEM AND METHOD FOR FINDING THE RECENCY OF AN INFORMATION AGGREGATE";

Ser. No. 10/286,261, is now pending filed 31 Oct. 2002 for "SYSTEM AND METHOD FOR EXAMINING THE AGING OF AN INFORMATION AGGREGATE";

Ser. No. 10/286,212, is now pending filed 31 Oct. 2002 for "SYSTEM AND METHOD FOR DETERMINING CONNECTIONS OVERLAP", Ser. No. 10/286,237, is now pending filed 31 Oct. 2002 for "SYSTEM AND METHOD FOR DETERMINING MEMBERSHIP OF INFORMATION AGGREGATEs";

Ser. No. 10/286,145, is now pending filed 31 Oct. 2002 for "SYSTEM AND METHOD FOR DETERMINING COMMUNITY OVERLAP";

Ser. No. 10/285,799, is now pending filed 31 Oct. 2002 for "SYSTEM AND METHOD FOR BUILDING SOCIAL NETWORKS BASED ON ACTIVITY AROUND SHARED VIRTUAL OBJECTS"; and Ser. No. 10/286,534, is now pending filed 31 Oct. 2002 for "SYSTEM AND METHOD FOR ANALYZING USAGE PATTERNS IN INFORMATION AGGREGATES".

BACKGROUND OF THE INVENTION

1. Technical Field of the Invention

This invention relates to a method and system for analyzing trends in an information aggregate. More particularly, it relates to evaluating information aggregates by visualizing changes in associated categories as a function of time.

2. Background Art

Corporations are flooded with information. The Web is a huge and sometimes confusing source of external information which only adds to the body of information generated internally by a corporation's collaborative infrastructure (e-Mail, Notes databases, QuickPlaces, and so on). With so much information available, it is difficult to determine what's important and what's worth looking at.

Web search engines have been provided with facilities for identifying information on the Web. Amazon.com, for example, categorizes documents, and the categories do appear in search results. For example, a general search on a term like "complexity" returns general categories to be examined. For example, the following message may be returned: "See matches in: Science (137), Professional & Technical (117), Nonfiction (115)."

A sense of what a particular document might be about on Amazon.com may be obtained through its "books in similar categories" facility. For example, similar books may be researched by subject:

Browse for books in:
Subjects>Science>History & Philosophy>General
Subjects>Science>Mathematics>General
Subjects>Science>Physics>General
Search for books by subject:
Science/Mathematics
Mathematics
Philosophy & Social Aspects
Physics The Amazon.com example is static, and does not deal with changes over time, or how changes propagate across collections of documents.

The Lotus Discovery Server (LDS) is a Knowledge Management (KM) tool that allows users to more rapidly locate the people and information they need to answer their questions. It categorizes information from many different sources (referred to generally as knowledge repositories) and provides a coherent entry point for a user seeking information. Moreover, as users interact with LDS and the knowledge repositories that it manages, LDS can learn what the users of the system consider important by observing how users interact with knowledge resources. Thus, it becomes easier for users to quickly locate relevant information.

Several approaches are known to the art for analyzing keywords in a set of documents to create clusters of related documents, or to classify documents into existing clusters. However, such approaches do not deal with changes over time, or propagation of categories through conceptual or physical space.

It is an object of the invention to provide an improved system and method for evaluating information aggregates.

SUMMARY OF THE INVENTION

A system and method for evaluating information aggregates by collecting a plurality of documents having non-unique values on a shared attribute into an information aggregate, identifying and visualizing a category or categories associated with the documents and, optionally, changes in frequency distribution or physical or conceptual space over time.

In accordance with an aspect of the invention, there is provided a computer program product configured to be operable to evaluate an information aggregate by visualizing categories associated with documents comprising the aggregate.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

Figure 1:
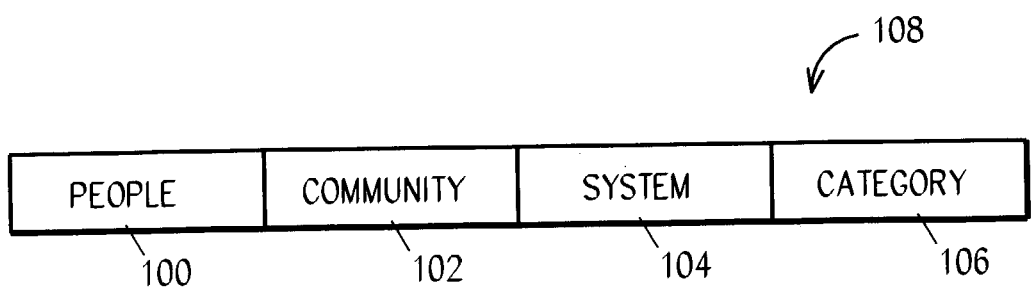
FIG. 1 is a diagrammatic representation of visualization portfolio strategically partitioned into four distinct domains in accordance with the preferred embodiment of the invention.

The Lotus Discovery Server (LDS) is a Knowledge Management (KM) tool that allows users to more rapidly locate the people and information they need to answer their questions. In an exemplary embodiment of the present invention, the functionality of the Lotus Discovery Server (LDS) is extended to include useful visualizations that magnify existing trends of an aggregate system. Useful visualizations of knowledge metric data store by LDS are determined, extracted, and visualized for a user.

On its lowest level, LDS manages knowledge resources. A knowledge resources is any form of document that contains knowledge or information. Examples include Lotus WordPro Documents, Microsoft Word Documents, webpages, postings to newsgroups, etc. Knowledge resources are typically stored within knowledge repositories—such as Domino.Doc databases, websites, newsgroups, etc.

When LDS is first installed, an Automated Taxonomy Generator (ATG) subcomponent builds a hierarchy of the knowledge resources stored in the knowledge repositories specified by the user. For instance, a document about working with XML documents in the Java programming language stored in a Domino.Doc database might be grouped into a category named 'Home>Development>Java>XML'. This categorization will not move or modify the document, just record its location in the hierarchy. The hierarchy can be manually adjusted and tweaked as needed once initially created.

A category is a collection of knowledge resources and other subcategories of similar content. Categories represent a more abstract re-organization of the contents of physical repositories, without displacing the available knowledge resources. For instance, in the following hierarchy:

Home (Root of the Hierarchy)
  Animals
    Dogs
    Cats
  Industry News and Analysis
    CNN
    ABC News
    MSNBC 'Home>Animals', 'Home>Industry News and Analysis', and 'Home>Industry News and Analysis>CNN' are each categories that can contain knowledge resources and other subcategories. Furthermore, 'Home>Industry News and Analysis>CNN' might contain documents from www.cnn.com and documents created by users about CNN articles which are themselves stored in a Domino.Doc database.

Knowledge repositories are then grouped into sets, known as communities. A community is a set of repositories primarily utilized by some particular group of people. Communities are only defined by administrative users of the system (unlike categories which can be created by LDS and then modified). If a user interacts with one of the repositories used to define Community A, then he is considered an active participant in that community. Thus, communities represent the physical storage of knowledge resources and provide a mechanism for LDS to observe the activity of a group of people.

As a user interacts with knowledge resources, LDS learns which categories they interact with the most. LDS maintains a score for the user, known as an affinity. An affinity is a rank that numerically captures how often a user interacts with a particular category compared to the level of interaction of other users. Affinities within the system are important in relation to the other affinities. Once a user's affinity reaches a certain threshold, LDS asks the user if he would like to publish that affinity. These affinities can then be made public, so that when other users search on a topic, LDS can identify users who are knowledgeable on that topic.

Another capability of LDS is its search functionality. Instead of returning only the knowledge resources (documents) that a standard web-based search engine might locate, LDS also returns the categories that the topic might be found within and the people that are most knowledge about that topic. LDS takes the users' affinities and the document values it has calculated into account when returning the results of a search. Thus, users with high affinities for a particular topic and documents that are rated with a higher document value are more likely to be returned. The present invention is unrelated to utilizing or extending this kind of localized searching functionality, but rather magnifies the larger trends within the system on a more general level.

The system and method of the preferred embodiments of the invention are built on a framework that collectively integrates data-mining, user-interface, visualization, and server-side technologies. An extensible architecture provides a layered process of transforming data sources into a state that can be interpreted and outputted by visualization components. This architecture is implemented through Java, Servlets, JSP, SQL, XML, and XSLT technology, and essentially adheres to a model-view controller paradigm, where interface and implementation components are separated. This allows effective data management and server side matters such as connection pooling to be independent Referring to FIG. 1, a visualization portfolio is strategically partitioned into four distinct domains, or explorers: people 100, community 102, system 104, and category 106. The purpose of these partitioned explorers 100–106 is to provide meaningful context for the visualizations. The raw usage pattern metrics produced from the Lotus Discovery Server (LDS) do not raise any significant value unless there is an applied context to it. In order to shed light on the hidden relationships behind the process of knowledge creation and maintenance, there is a need to ask many important questions. Who are the knowledge creators? Who are the ones receiving knowledge? What group of people are targeted as field experts? How are groups communicating with each other? Which categories of information are thriving or lacking activity? How is knowledge transforming through time? While answering many of these questions, four key targeted domains, or explorer types 100–106 are identified, and form the navigational strategy for user interface 108. This way, users can infer meaningful knowledge trends and dynamics that are context specific.

People Domain 100

People explorer 100 focuses on social networking, community connection analysis, category leaders, and affinity analysis. The primary visualization component is table listings and associations.

Community Domain 102

Community explorer 102 focuses on acceleration, associations, affinity analysis, and document analysis for communities. The primary visualization components are bar charts and table listings. Features include drill down options to view associated categories, top documents, and top contributors. The option to display associated categories is an embodiment of the present invention.

System Domain 104

System explorer 104 focuses on high level activity views such as authors, searches, accesses, opens, and responses for documents. The primary visualization components are bar charts (grouped and stacked). Features include zooming and scrollable regions.

Category Domain 106

Category explorer 106 focuses on lifespan, acceleration, affinity analysis, and document analysis of categories generated by a Lotus Discovery Server's Automated Taxonomy Generator. The primary visualization components are bar charts. Features include drill down options to view subcategories, top documents, top contributors, category founders, and document activity.

System Overview

Figure 2:
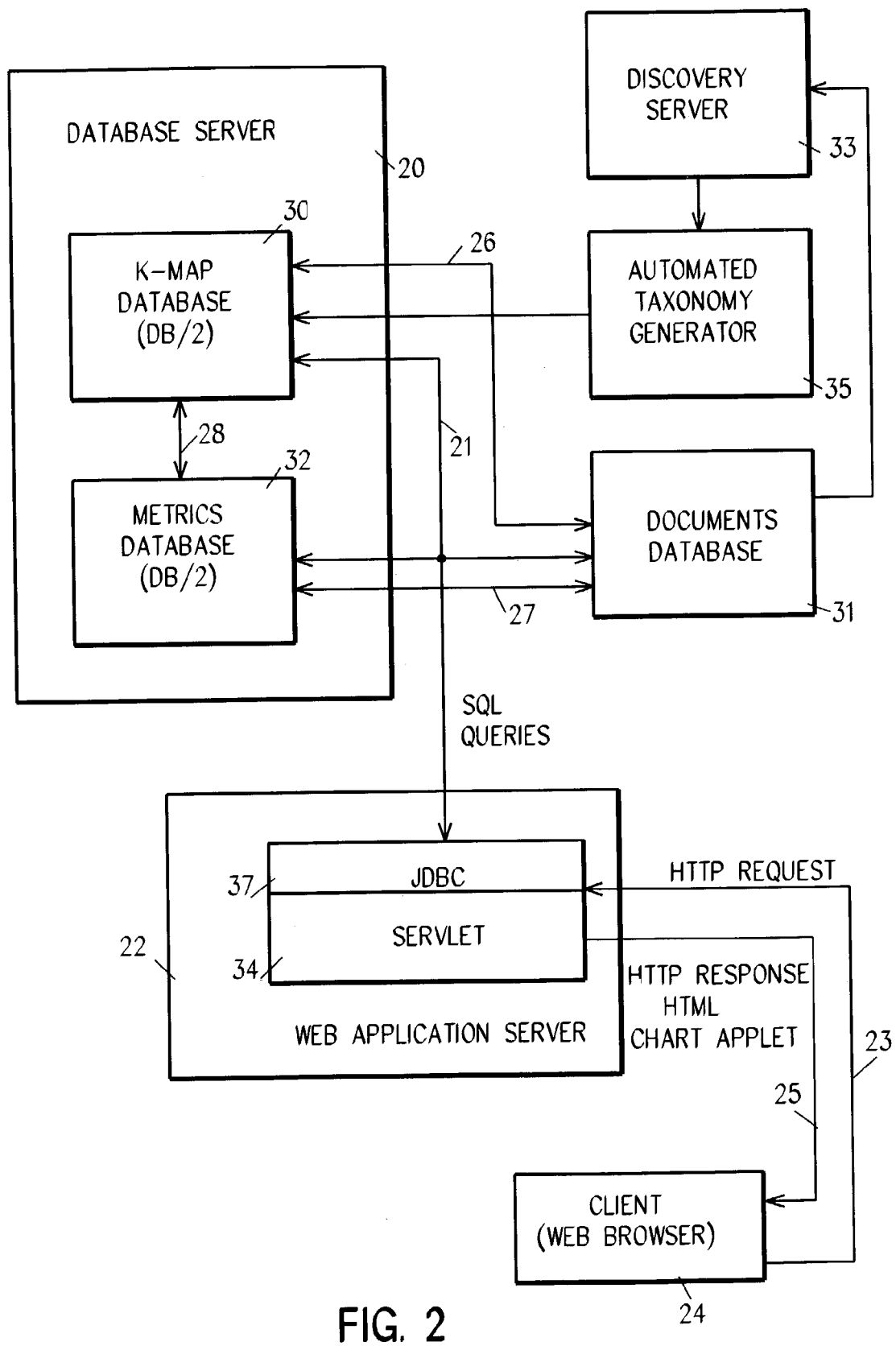
FIG. 2 is a system diagram illustrating a client/server system in accordance with the preferred embodiment of the invention.

Referring to FIG. 2, an exemplary client/server system is illustrated, including database server 20, discovery server 33, automated taxonomy generator 35, web application server 22, and client browser 24.

Knowledge management is defined as a discipline to systematically leverage information and expertise to improve organizational responsiveness, innovation, competency, and efficiency. Discovery server 33 (e.g. Lotus Discovery Server) is a knowledge system which may be deployed across one or more servers. Discovery server 33 integrates code from several sources (e.g., Domino, DB2, InXight, KeyView and Sametime) to collect, analyze and identify relationships between documents, people, and topics across an organization. Discovery server 33 may store this information in a data store 31 and may present the information for browse/query through a web interface referred to as a knowledge map (e.g., K-map) 30. Discovery server 33 regularly updates knowledge map 30 by tracking data content, user expertise, and user activity which it gathers from various sources (e.g. Lotus Notes databases, web sites, file systems, etc.) using spiders.

Database server 20 includes knowledge map database 30 for storing a hierarchy or directory structure which is generated by automated taxonomy generator 35, and metrics database 32 for storing a collection of attributes of documents stored in documents database 31 which are useful for forming visualizations of information aggregates. The k-map database 30, the documents database 31, and the metrics database are directly linked by a key structure represented by lines 26, 27 and 28. A taxonomy is a generic term used to describe a classification scheme, or a way to organize and present information. Knowledge map 30 is a taxonomy, which is a hierarchical representation of content organized by a suitable builder process (e.g., generator 35).

A spider is a process used by discovery server 33 to extract information from data repositories. A data repository (e.g. database 31) is defined as any source of information that can be spidered by a discovery server 33.

Java Database Connectivity API (JDBC) 37 is used by servlet 34 to issue Structured Query Language (SQL) queries against databases 30, 31, 32 to extract data that is relevant to a users request 23 as specified in a request parameter which is used to filter data. Documents database 31 is a storage of documents in, for example, a Domino database or DB2 relational database.

The automated taxonomy generator (ATG) 35 is a program that implements an expectation maximization algorithm to construct a hierarchy of documents in knowledge map (K-map) metrics database 32, and receives SQL queries on link 21 from web application server 22, which includes servlet 34. Servlet 34 receives HTTP requests on line 23 from client 24, queries database server 20 on line 21, and provides HTTP responses, HTML and chart applets back to client 24 on line 25.

Discovery server 33, database server 20 and related components are further described in U.S. patent application Ser. No. 10/044,914 is now pending filed 15 Jan. 2002 for System and Method for Implementing a Metrics Engine for Tracking Relationships Over Time.

Figure 3:
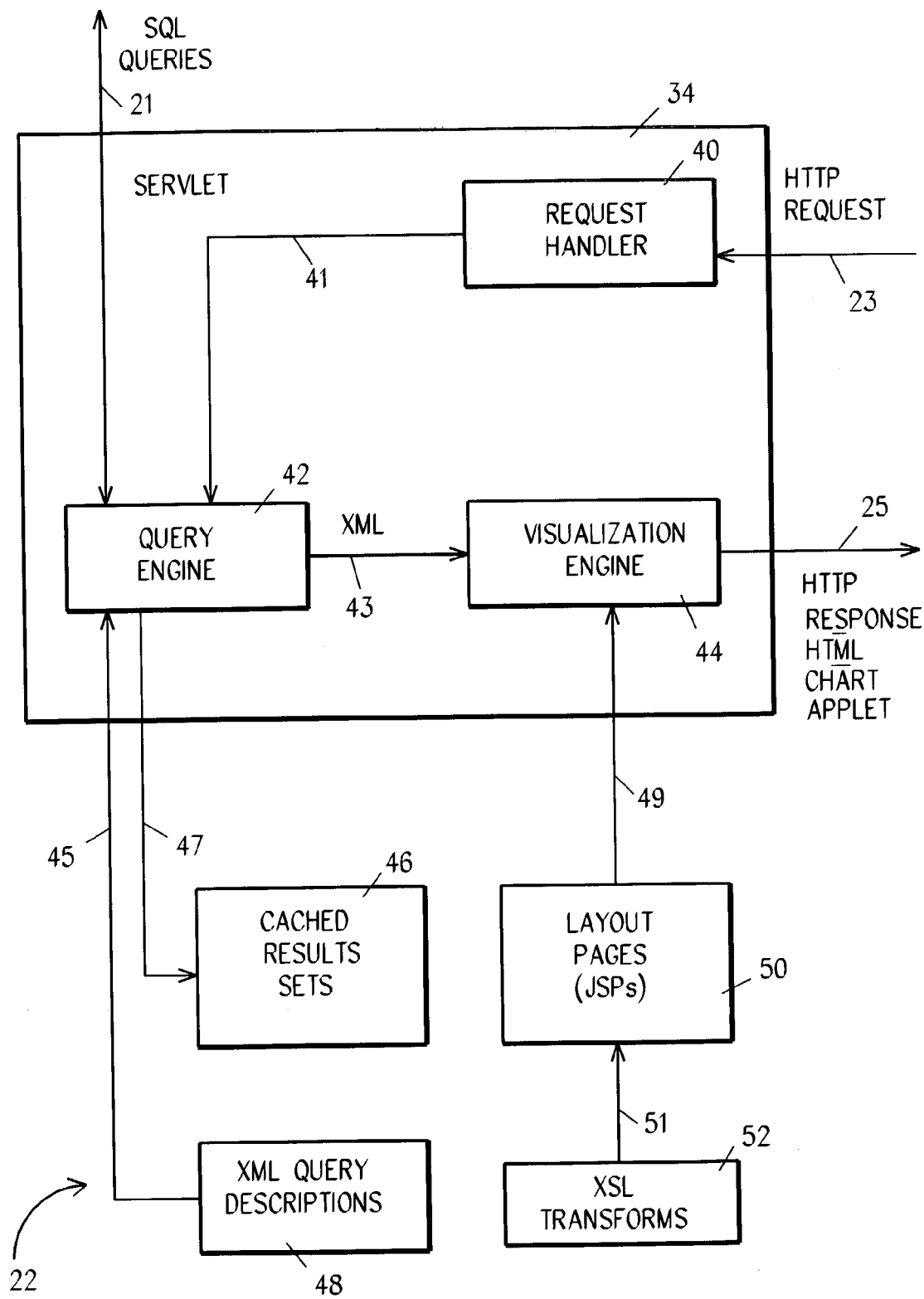
FIG. 3 is a system diagram further describing the web application server of FIG. 2.

Referring to FIG. 3, web application server 22 is further described. Servlet 34 includes request handler 40 for receiving HTTP requests on line 23, query engine 42 for generating SQL queries on line 21 to database server 20 and result set XML responses on line 43 to visualization engine 44. Visualization engine 44, selectively responsive to XML 43 and layout pages (JSPS) 50 on line 49, provides on line 25 HTTP responses, HTML, and chart applets back to client 24. Query engine 42 receives XML query descriptions 48 on line 45 and caches and accesses results sets 46 via line 47. Layout pages 50 reference XSL transforms 52 over line 51.

In accordance with the preferred embodiment of the invention, visualizations are constructed from data sources 32 that contain the metrics produced by a Lotus Discovery Server. The data source 32, which may be stored in an IBM DB2 database, is extracted through tightly coupled Java and XML processing.

Figure 4:
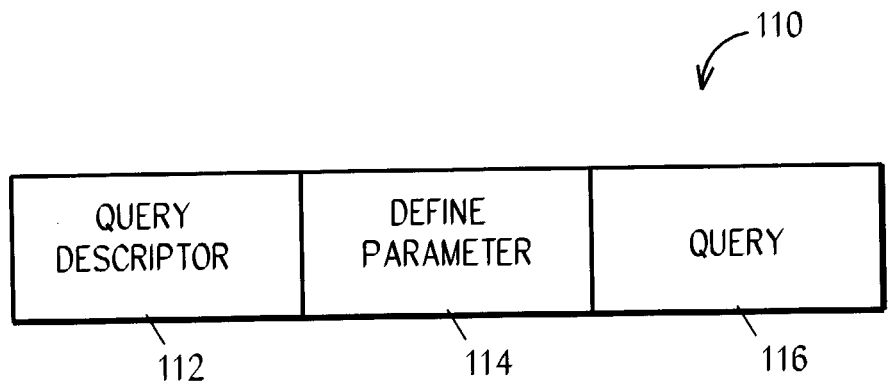
FIG. 4 is a diagrammatic representation of the XML format for wrapping SQL queries.

Referring to FIG. 4, the SQL queries 21 that are responsible for extraction and data-mining are wrapped in a result set XML format having a schema (or structure) 110 that provides three main tag elements defining how the SQL queries are executed. These tag elements are <queryDescriptor> 112, <defineParameter> 114, and <query> 116.

The <queryDescriptor> element 112 represents the root of the XML document and provides an alias attribute to describe the context of the query. This <queryDescriptor> element 112 is derived from http request 23 by request handler 40 and fed to query engine 42 as is represented by line 41.

The <defineParameter> element 114 defines the necessary parameters needed to construct dynamic SQL queries 21 to perform conditional logic on metrics database 32. The parameters are set through its attributes (localname, requestParameter, and defaultValue). The actual parameter to be looked up is requestParameter. The localname represents the local alias that refers to the value of requestParameter. The defaultValue is the default parameter value.

XML structure 110 includes <query> element 116 containing the query definition. There can be one or more <query> elements 116 depending on the need for multiple query executions. Element 116 includes a <data> child node element used to wrap the actual query through its corresponding child nodes. The three essential child nodes of <data> are <queryComponent>, <useParameter>, and <queryAsFullyQualified>. The <queryComponent> element wraps the main segment of the SQL query. The <useParameter> element allows parameters to be plugged into the query as described in <defineParameter>. The <queryAsFullyQualified> element is used in the case where the SQL query 21 needs to return an unfiltered set of data.

When a user at client browser 24 selects a metric to visualize, the name of an XML document is passed as a parameter in HTTP request 23 to servlet 34 as follows:
<input type=hidden name="queryAlias" value="AffinityPerCategory">

In some cases, there is a need to utilize another method for extracting data from the data source 32 through the use of a generator Java bean. The name of this generator bean is passed as a parameter in HTTP request 23 to servlet 34 as follows:
<input type=hidden name="queryAlias" value="PeopleInCommonBy CommGenerator">

Once servlet 34 receives the XML document name or the appropriate generator bean reference at request handler 40, query engine 42 filters, processes, and executes query 21. Once query 21 is executed, data returned from metrics database 32 on line 21 is normalized by query engine 42 into an XML format 43 that can be intelligently processed by an XSL stylesheet 52 further on in the process.

Figure 5:
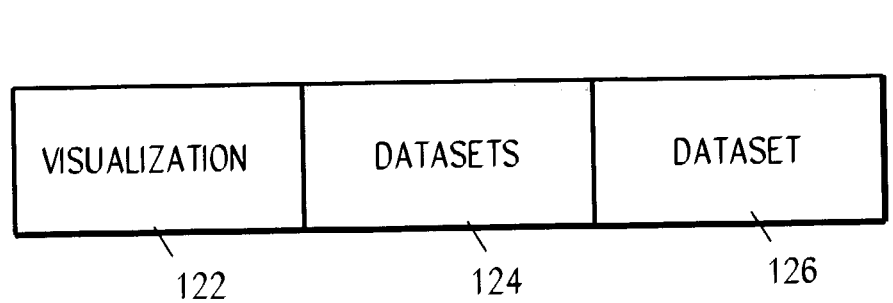
FIG. 5 is a diagrammatic representation of a normalized XML format, or QRML.

Referring to FIG. 5, the response back to web application server 22 placed on line 21 is classified as a Query Response Markup Language (QRML) 120. QRML 120 is composed of three main elements. They are <visualization> 122, <datasets> 124, and <dataset> 126. QRML structure 120 describes XML query descriptions 48 and the construction of a result set XML on line 43.

The <visualization> element 122 represents the root of the XML document 43 and provides an alias attribute to describe the tool used for visualization, such as a chart applet, for response 25.

The <datasets> element 124 wraps one or more <dataset> collections depending on whether multiple query executions are used.

The <dataset> element 126 is composed of a child node <member> that contains an attribute to index each row of returned data. To wrap the raw data itself, the <member> element has a child node <elem> to correspond to column data.

Data Translation and Visualization

Referring further to FIG. 3, for data translation and visualization, in accordance with the architecture of an exemplary embodiment of the invention, an effective delineation between the visual components (interface) and the data extraction layers (implementation) is provided by visualization engine 44 receiving notification from query engine 42 and commanding how the user interface response on line 25 should be constructed or appear. In order to glue the interface to the implementation, embedded JSP scripting logic 50 is used to generate the visualizations on the client side 25. This process is two-fold. Once servlet 34 extracts and normalizes the data source 32 into the appropriate XML structure 43, the resulting document node is then dispatched to the receiving JSP 50. Essentially, all of the data packaging is performed before it reaches the client side 25 for visualization. The page is selected by the value parameter of a user HTTP request, which is an identifier for the appropriate JSP file 50. Layout pages 50 receive the result set XML 120 on line 43, and once received an XSL transform takes effect that executes a transformation to produce parameters necessary to launch the visualization.

For a visualization to occur at client 24, a specific set of parameters needs to be passed to the chart applet provided by, for example, Visual Mining's Netcharts solution. XSL transformation 52 generates the necessary Chart Definition Language (CDLs) parameters, a format used to specify data parameters and chart properties. Other visualizations may involve only HTML (for example, as when a table of information is displayed).

An XSL stylesheet (or transform) 52 is used to translate the QRML document on line 43 into the specific CDL format shown above on line 25.

This process of data retrieval, binding, and translation all occur within a JSP page 50. An XSLTBean opens an XSL file 52 and applies it to the XML 43 that represents the results of the SQL query. (This XML is retrieved by calling queryResp.getDocumentElement( )). The final result of executing this JSP 50 is that a HTML page 25 is sent to browser 24. This HTML page will include, if necessary, a tag that runs a charting applet (and provides that applet with the parameters and data it needs to display correctly). In simple cases, the HTML page includes only HTML tags (for example, as in the case where a simple table is displayed at browser 24). This use of XSL and XML within a JSP is a well-known Java development practice.

In Ser. No. 10/286,211, is now pending filed Oct. 31, 2002 for "SYSTEM AND METHOD FOR DETERMINING FOUNDERS OF AN INFORMATION AGGREGATE", assignee docket LOT920020007US1, Table 1 illustrates an example of XML structure 110; Table 2 illustrates an example of the normalized XML, or QRML, structure; Table 3 illustrates an example of CDL defined parameters fed to client 24 on line 25 from visualization engine 44; Table 4 illustrates an example of how an XSL stylesheet 52 defines translation; and Table 5 is script illustrating how pre-packaged document node 43 is retrieved and how an XSL transformation 52 is called to generate the visualization parameters.

An exemplary embodiment of the system and method of the invention may be built using the Java programming language on the Jakarta Tomcat platform (v3.2.3) using the Model-View-Controller (MVC) (also known as Model 2) architecture to separate the data model from the view mechanism.

Information Aggregate

Figure 6:
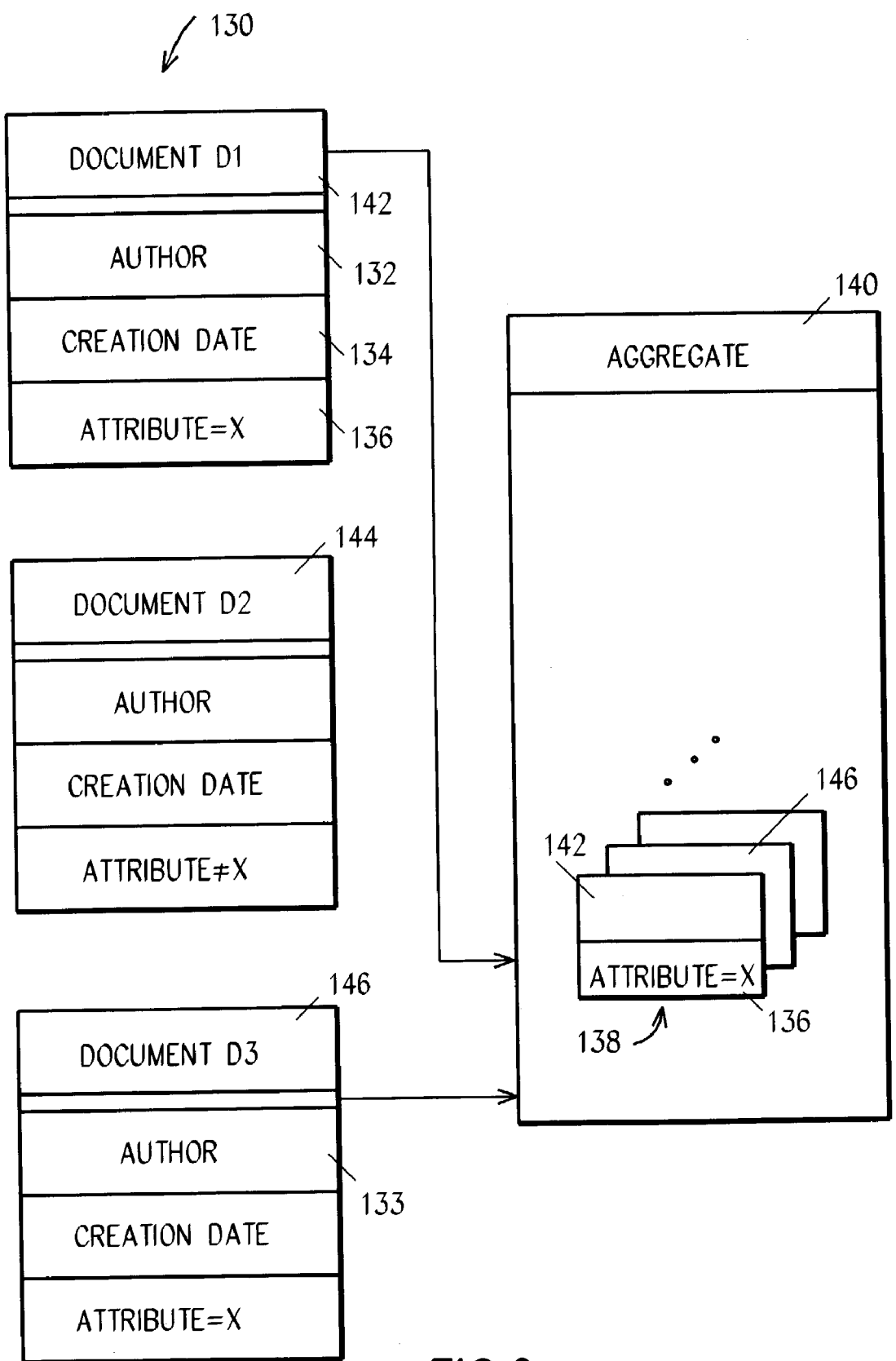
FIG. 6 is a diagrammatic representation of an aggregate in accordance with the preferred embodiment of the invention.

Referring to FIG. 6, a system in accordance with the present invention contains documents 130 such as Web pages, records in Notes databases, and e-mails. Each document 130 is associated with its author 132, and the date of its creation 134. A collection of selected documents 130 forms an aggregate 140. An aggregate 140 is a collection 138 of documents 142, 146 having a shared attribute 136 having non-unique values. Documents 138 can be aggregated by attributes 136 such as:

Category—a collection of documents 130 about a specific topic.

Community—a collection of documents 130 of interest to a given group of people. Such a collection can be formed by identifying a set of knowledge repositories used by a given group of people. The union of the documents in all specified repositories represents the community.

Location—a collection of documents 130 authored by people in a geographic location (e.g. USA, Utah, Massachusetts, Europe).

Job function or role—a collection of documents 130 authored by people in particular job roles (e.g. Marketing, Development).

Group (where group is a list of people)—a collection of documents authored by a given set of people.

Any other attributed 136 shared by a group (and having non-unique values).

Categorization of Information Aggregates

In accordance with the present invention, a system and method is provided for reporting on the categories associated with an aggregate, and visualizing how the associations change over time and space. Further provided in accordance with exemplary embodiments are derivations of collections that represented project teams or communities, as well as additional mechanisms of organization (such as job role, geography).

An information aggregate may be evaluated by looking at the way in which the documents contained in the aggregate are categorized. A category represents a topic that one or more people are writing about in the documents contained within an information aggregate. It is then possible to identify potentially interesting aggregates by looking at the categories which are used to organize the documents that they contain. It is also possible to visualize how the distribution of categories changes over time or over space.

As analysis of changes in categories can help to evaluate (FIG. 11, step 429) the effectiveness of organizational change initiative and help to design training programs to facilitate the communication of key topics (such as corporate strategy).

A system in accordance with the present invention has the following basic characteristics:

1. The system contains documents. Examples of documents include Web pages, records in Notes databases, and e-mails.
2. Each document is associated with one or more categories. A category groups together documents that concern a particular topic, and provides a label for the topic.
3. Documents can be collected together into aggregates. One example of an aggregate might be a community which could group together documents that concerned a particular group of people.

Documents can be aggregated as described above.

As previously noted, the present invention is concerned with (1) reporting on the categories associated with an aggregate, and (2) visualizing how the associations change over time and space.

Figure 7:
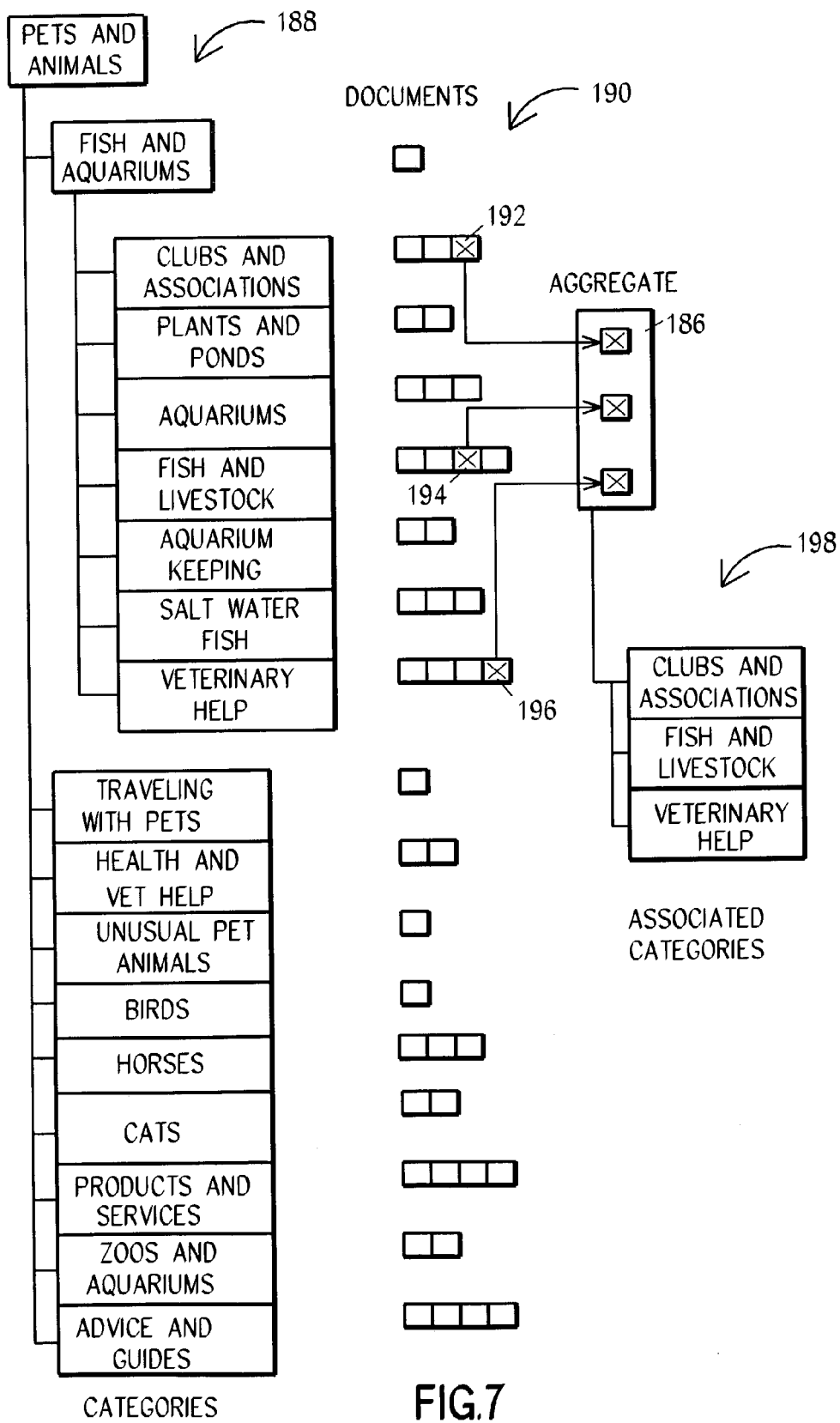
FIG. 7 is a diagrammatic representation illustrating categories associated with an aggregate.

Referring to FIG. 7, in accordance with an exemplary embodiment of the invention, Lotus Discovery Server is used to analyze documents contained in various repositories, and organize those documents into a hierarchy 188 of categories, each category including one or more documents 190. In this example, documents 192, 194, and 196 are collected as previously described into an aggregate, such as a collection of communities 186. Because each of documents 192, 194, 196 in aggregate 186 is categorized a list 198 of categories that are associated with the communities within aggregate 186 may be determined. This list 198 displays to the user what the people in the communities represented by aggregate 186 write about.

Figure 11:
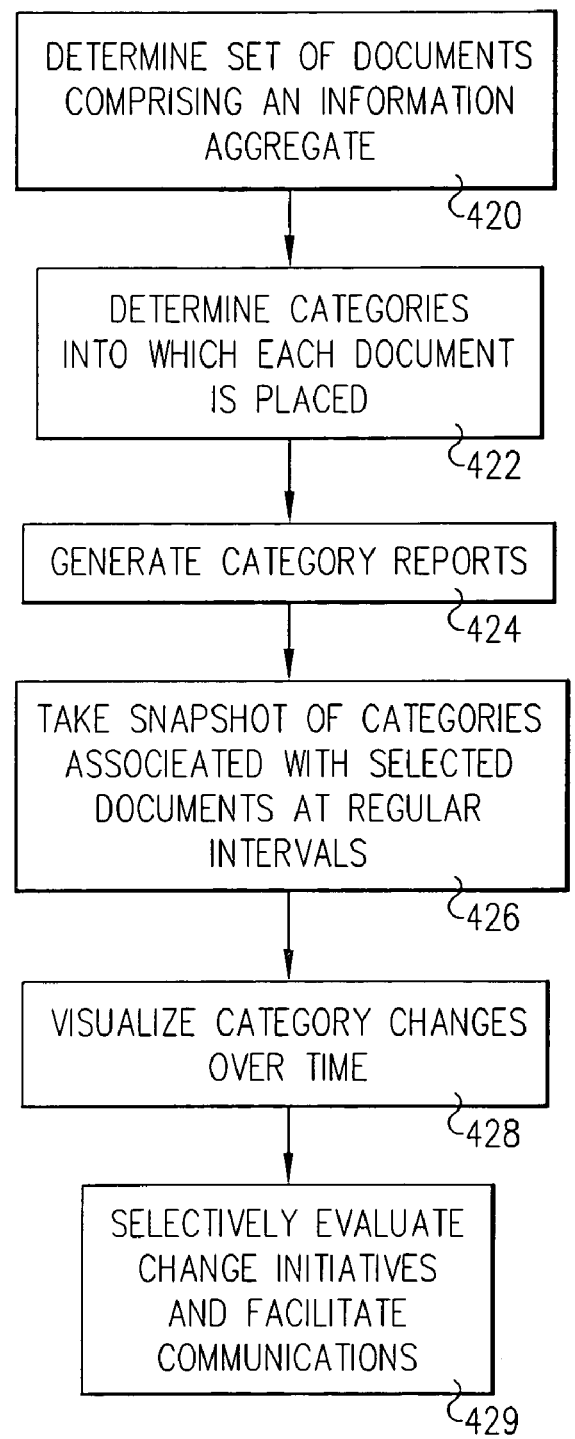
FIG. 11 is a flow chart illustrating a preferred embodiment of the invention.
Figure 12:
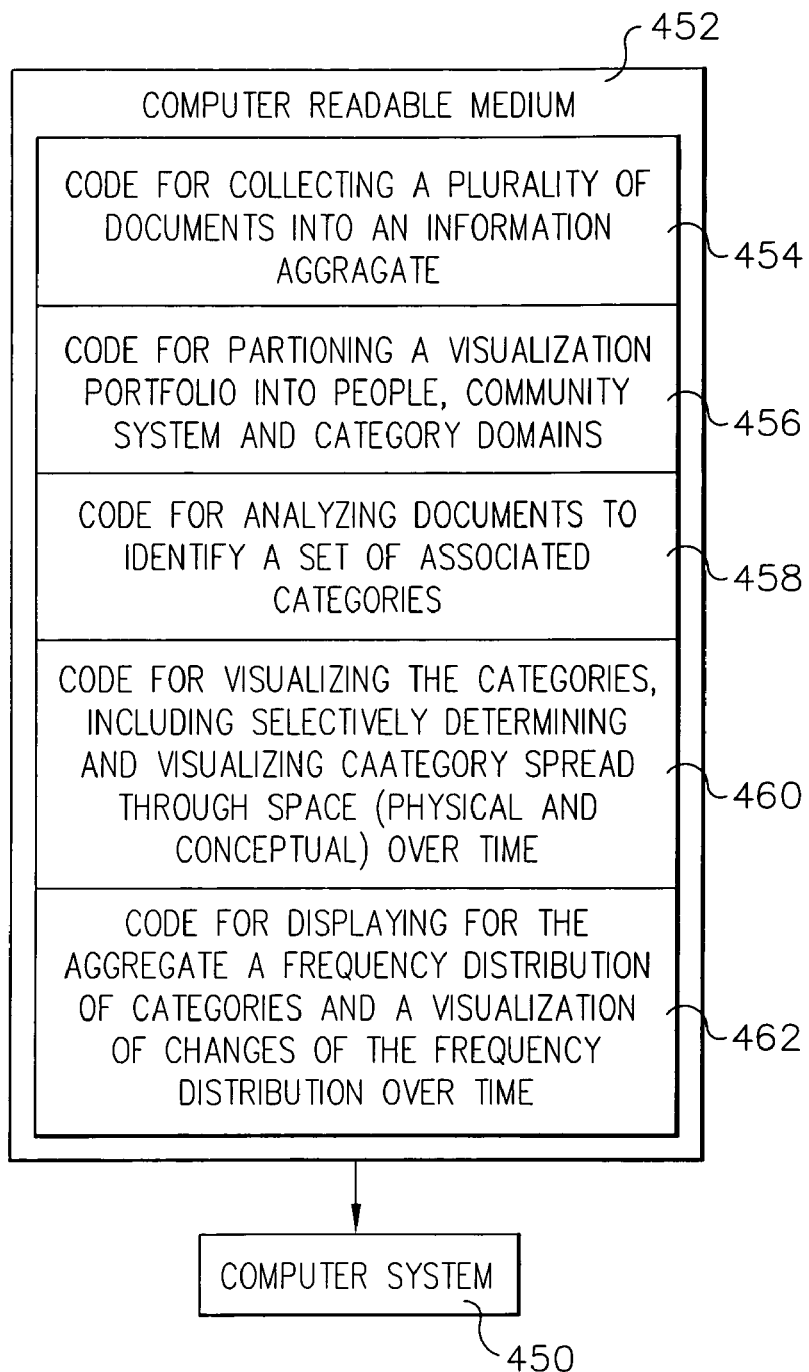
FIG. 12 is a schematic representation of a computer program product for evaluating information aggregates to enable visualization of relationships behind a process of knowledge creation and maintenance to infer context specific knowledge trends and dynamics for evaluating organizational change initiatives and facilitating communication in accordance with the preferred embodiment of the invention.

Referring to FIG. 11, in step 420 the set of documents that is contained by the aggregate is determined. Then, in step 422, the category into which each document has been placed is determined. (This can be done through a variety of existing mechanisms, including automatic categorization by a product such as Lotus Discovery Server.) In step 424, reports are may be generated on the categories, such as a simple list of the categories associated with the aggregate, or a frequency distribution of the categories (the number of occurrences of each category in the aggregate).

Figure 10:
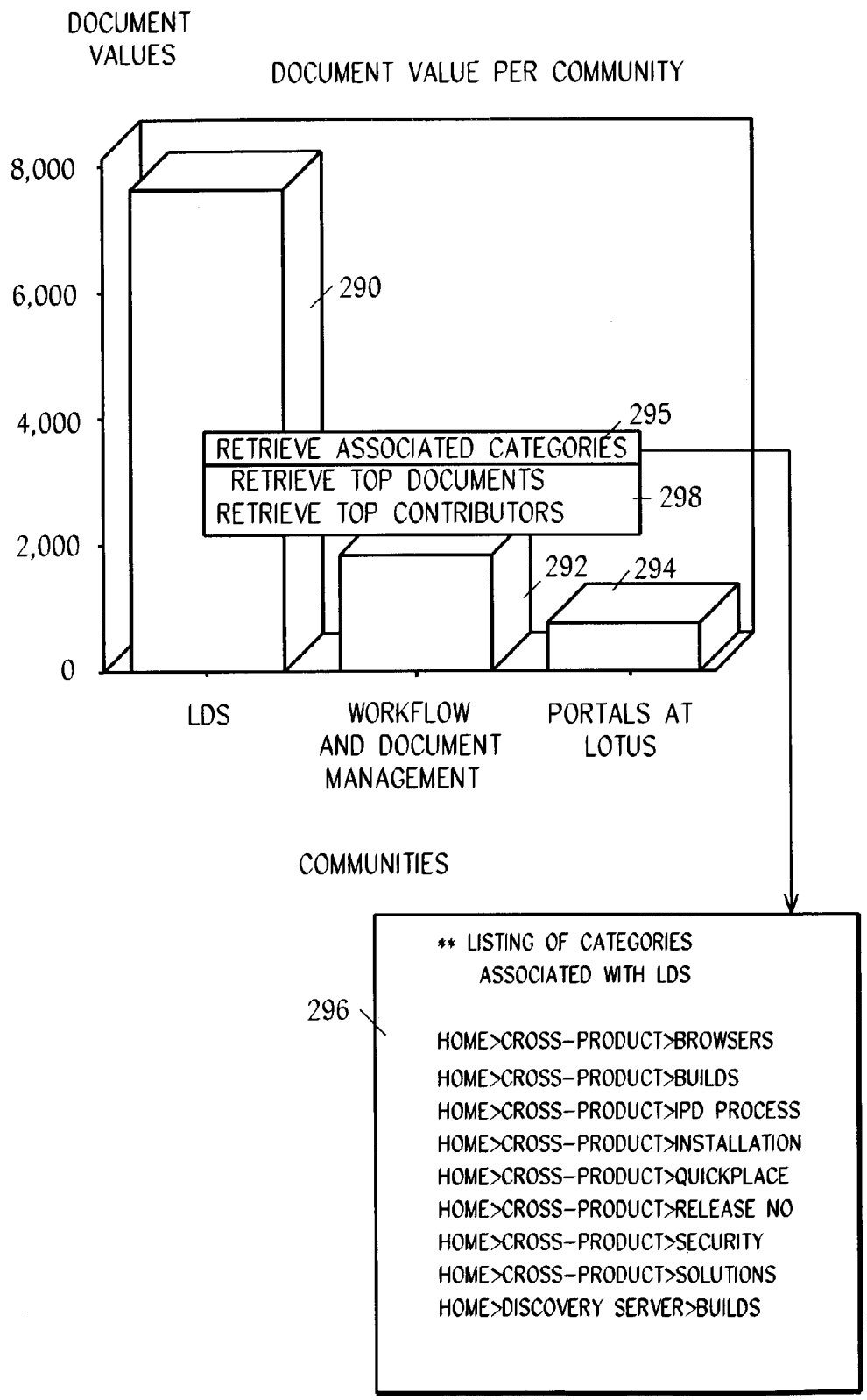
FIG. 10 is an exemplary visualization displaying categories associated with a selected community.

FIG. 10 illustrates such a report. In FIG. 10, a bar chart of document values for several aggregates, or communities 290, 295, 294, is illustrated along with a drop down menu allowing the user to selected one of actions 298. In this case, the user has selected retrieve associated categories 295, which results in the opening of a window 296 displaying of a simple list of categories associated with the Lotus Discovery Server (LDS) community.

This kind of analysis also enables visualization of what the people in a particular aggregate write about. For example, if an aggregate contained the set of documents associated with a project team, the reports would reveal what topics are commonly discussed by that project team, from which inferences may be drawn about the project based on what the team members write about.

Given the raw data generated from steps 420 and 422, changes over time may be visualized in step 428 by taking in step 426 snapshots of the set of categories associated with documents at regular intervals. This enables visualization of changes in the aggregates, or changes across a collection of aggregates. For a particular aggregate, the frequency distribution of categories changes over time (for example, through an animated bar chart that displays a series of frequency diagrams, or through line charts that track changes in a particular category) may be visualized. Also, as are illustrated in FIGS. 8 and 9, an aggregate's time line, which could show when new categories become associated with an aggregate, or when old categories drop away, may be visualized.

Figure 8:
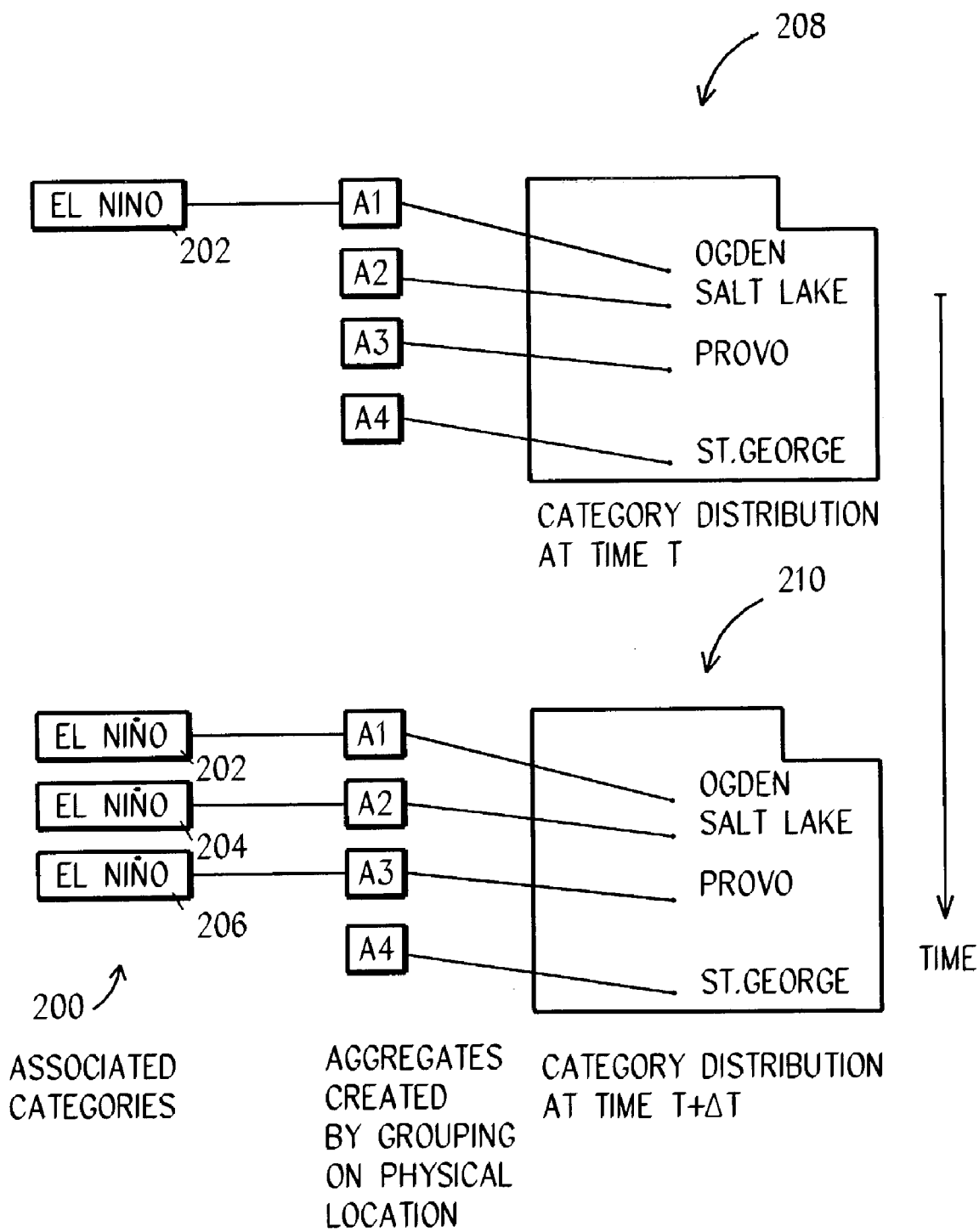
FIG. 8 is a diagrammatic representation illustrating change as a function of time in associated categories of aggregates grouped on physical location.
Figure 9:
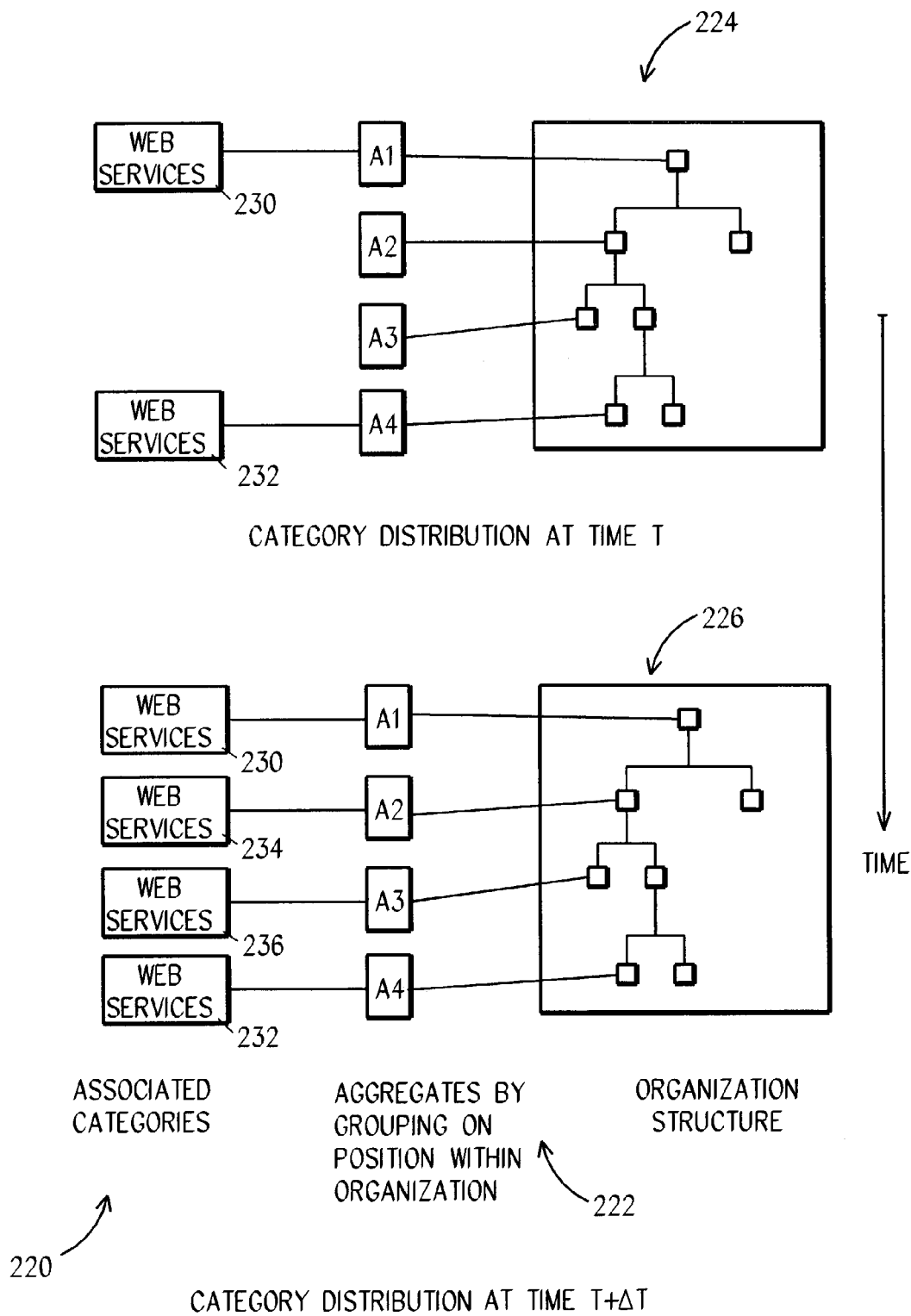
FIG. 9 is a diagrammatic representation illustrating change as a function of time in associated categories of aggregates grouped on position within an organizational structure.

Referring to FIGS. 8 and 9, given a collection of aggregates, spatial representations of the collection may be visualized and how categories propagate through physical or conceptual space tracked over time.

For example, referring to FIG. 8, a collection of aggregates A1–A4 represents geographies, where each aggregate contains the documents authored by a person in a particular geographic location, Ogden, Salt Lake, Provo, and St. George, respectively, which aggregates A1–A4 are plotted or keyed to map 208 by their location, as shown. As illustrated, category El Niño 202 is a category associated with aggregate A1 at time T. Next, the user can select one or more categories to analyze, in this case category El Niño El, and then visualize how the selected categories 202 spread geographically over time, this case at time T+ΔT to Salt Lake and Provo, as is represented by category 204 associated with aggregate A2, and category 206 associated with aggregate A3. At time T, only aggregate A1 corresponding to location Ogden referenced category El Niño, whereas at time T+ΔT, aggregates A1, A2, and A3 all referenced El Niño 202, 204, and 206, respectively.

Referring to FIG. 9, a collection of aggregates A1–A4 represents job roles, where each aggregate A1–A4 contains the documents authored by a person with a particular job role within organization structure 224. These aggregates may be plotted or referenced to a conceptual map of the job roles (like an organizational chart 224). The user can select one or more categories, such as associated category 230, 232 to analyze, and then watch how the categories 230–236 spread across the job role map 226 over time. This enables a user to visualize, for example, how interest in web services begins with researchers, spreads to industry analysts and entrepreneurs, and then to product managers, designers, and engineers.

Referring to FIG. 10, a collection of aggregates 290, 292, 294 are plotted in a simple bar chart (one bar per aggregate), where the height of the bar represents the frequency with which a category occurs in the aggregate, then animate that chart over time (not shown). Or, the user may request a graph of some other parameter, such as number of documents per aggregate, and then color code the bars based on number of occurrences of a particular category, and animate that chart over time. Or, the user can graph multiple category strengths over time as waves in order to see how particular categories correspond in time.

Thus, in accordance with the preferred embodiments of the invention, a user can visualize how a category spreads either through physical or conceptual space, over time.

Advantages Over the Prior Art

It is an advantage of the invention that there is provided an improved system and method for evaluating information aggregates.

It is a further advantage of the invention that there is provided an improved system and method for evaluating information aggregates by analyzing associated categories.

It is a further advantage of the invention that there is provided a system and method for determining the nature of a document collection by analyzing the categories into which each document is placed.

It is a further advantage of the invention that there is provided a system and method for visualizing how a category spreads either through physical or conceptual space, over time.

Alternative Embodiments

It will be appreciated that, although specific embodiments of the invention have been described herein for purposes of illustration, various modifications may be made without departing from the spirit and scope of the invention. In particular, it is within the scope of the invention to provide a computer readable element, or memory medium, for storing program instructions readable by a computer, for controlling the operation of a computer 450 according to the method of the invention and/or to structure its components in accordance with the system of the invention, that method including in step 454 collecting a plurality of documents into an information aggregate, in step 456 partitioning a visualization portfolio into people, community, system and category domains, in step 458 analyzing documents to identify a set of associated categories, in step 460 visualizing the categories, including selectively determining and visualizing category spread through physical and conceptual space over time, and in step 462 displaying for the aggregate a frequency distribution of categories and a visualization of changes of the frequency distribution over time for implementing training programs to facilitate communication of key topics among individuals and within groups.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for evaluating information aggregates to enable visualization of relationships behind a process of knowledge creation and maintenance and to infer context specific knowledge trends and dynamics to evaluate organizational change initiatives and to implement training programs to facilitate communication of key topics, comprising:

collecting a plurality of documents having non-unique values on a shared attribute into an information aggregate;

partitioning a visualization portfolio into people, community, system and category domains for enabling visualization of said context specific knowledge trends and dynamics including identification of individuals creating and receiving knowledge, individuals targeted as field experts, group communication dynamics, and categories of information that are thriving and those lacking activity;

identifying through analysis of document content a set of categories associated with said documents;

visualizing said categories, including selectively determining and visualizing how said category spreads through space over time, how said category spreads through conceptual space over time, and how said category spreads through physical space over time;

displaying for said aggregate a frequency distribution of categories and a visualization of changes of said frequency distribution over time; and responsive to said visualizing and displaying steps, selectively evaluating organizational change initiatives and implementing training programs to facilitate communication of key topics among said individuals and within said group.

2. System for evaluating an information aggregate to enable visualization of relationships behind a process of knowledge creation and maintenance and to infer context specific knowledge trends and dynamics to evaluate organizational chance initiatives and to implement training programs to facilitate communication of key tonics, comprising:

a metrics database for storing document indicia including associated categories;

a query engine responsive to a user request and said metrics database for aggregating documents having same, unique attributes in an information aggregate and for partitioning a visualization portfolio into people, community, system and category domains for enabling visualization of said context specific knowledge trends and dynamics including identification of individuals creating and receiving knowledge, individuals targeted as field experts, group communication dynamics, and categories of information that are thriving and those lacking activity;

said query engine further for identifying categories associated with documents comprising said information aggregate; and a visualization engine for visualizing said categories, said visualization engine selectively responsive to user request for visualizing changes in said categories over time and changes in said categories with respect to physical and conceptual space over time to selectively evaluate organizational change initiatives and to implement training programs to facilitate communication of key topics among said individuals and within said group.

3. A computer program product for evaluating information aggregates to enable visualization of relationships behind a process of knowledge creation and maintenance and to infer context specific knowledge trends and dynamics to evaluate organizational change initiatives and to implement training programs to facilitate communication of key topics, said computer program product comprising:

a computer readable medium;

first program instructions for collecting a plurality of documents having non-unique values on a shared attribute into an information aggregate;

second program instructions for identifying a set of categories associated with said documents and for partitioning a visualization portfolio into people, community, system and category domains for enabling visualization of said context specific knowledge trends and dynamics including identification of individuals creating and receiving knowledge, individuals targeted as field experts, group communication dynamics, and categories of information that are thriving and those lacking activity;

third program instructions for displaying for said aggregate a frequency distribution of categories in said set of categories; and fourth program instructions for displaying for said aggregate a visualization of changes of said frequency distribution over time, selectively including visualizing how each said category spreads through conceptual and physical space over time to evaluate organizational change initiatives and to implement training programs to facilitate communication of key topics among said individuals and within said group; and wherein said first, second, third, and fourth program instructions are recorded on said computer readable medium.

* * * * *